US010826361B2

(12) United States Patent
Fujimoto

(10) Patent No.: US 10,826,361 B2
(45) Date of Patent: Nov. 3, 2020

(54) ROTARY ELECTRICAL MACHINE

(71) Applicant: FANUC CORPORATION, Yamanashi (JP)

(72) Inventor: Jun Fujimoto, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 16/356,682

(22) Filed: Mar. 18, 2019

(65) Prior Publication Data

US 2019/0305653 A1    Oct. 3, 2019

(30) Foreign Application Priority Data

Mar. 28, 2018    (JP) .................................. 2018-062659

(51) Int. Cl.
| H02K 15/02 | (2006.01) |
| H02K 3/32 | (2006.01) |
| H02K 5/04 | (2006.01) |
| H02K 1/28 | (2006.01) |
| H02K 15/14 | (2006.01) |

(52) U.S. Cl.
CPC .............. *H02K 15/02* (2013.01); *H02K 1/28* (2013.01); *H02K 3/32* (2013.01); *H02K 5/04* (2013.01); *H02K 15/14* (2013.01)

(58) Field of Classification Search
CPC ............ H02K 15/02; H02K 1/28; H02K 3/32; H02K 5/04; H02K 15/14; H02K 5/00; H02K 5/02; H02K 5/06; H02K 5/10; H02K 5/12; H02K 5/132; H02K 5/136; H02K 5/15; H02K 5/22; H02K 5/26

USPC ..................... 310/40 R, 88, 89, 91
See application file for complete search history.

(56) References Cited

U.S. PATENT DOCUMENTS

| 6,541,883 B2 * | 4/2003 | Uffelman ................ F04B 17/03 310/45 |
| 10,407,775 B2 * | 9/2019 | Sakurada ................ C25D 13/12 |
| 2003/0025406 A1 * | 2/2003 | Abe .......................... C23C 4/06 310/45 |
| 2009/0021101 A1 * | 1/2009 | Okamoto ................ H02K 15/00 310/216.004 |
| 2010/0277031 A1 * | 11/2010 | Nelges .................... C09J 161/06 310/216.137 |

(Continued)

FOREIGN PATENT DOCUMENTS

| JP | H10-112953 A | 4/1998 |
| JP | H 10112953 | * 4/1998 |

(Continued)

OTHER PUBLICATIONS

An Office Action mailed by the Japanese Patent Office dated Jan. 28, 2020, which corresponds to Japanese Patent Application No. 2018-062659 and is related to U.S. Appl. No. 16/356,682.

*Primary Examiner* — Tulsidas C Patel
*Assistant Examiner* — Ahmed Elnakib
(74) *Attorney, Agent, or Firm* — Studebaker & Brackett PC

(57) ABSTRACT

A rotary electrical machine of the present invention comprises a housing including: a first member with a paint surface with paint and a machining surface adjoining the paint surface after being subjected to machining, the paint surface including a boundary area formed at a boundary part with the machining surface; and a second member covering the boundary area.

4 Claims, 3 Drawing Sheets

(56) References Cited

U.S. PATENT DOCUMENTS

| | | | | |
|---|---|---|---|---|
| 2013/0335859 A1* | 12/2013 | Tatsumi | ............... | G11B 33/02 |
| | | | | 360/99.08 |
| 2015/0372560 A1* | 12/2015 | Liang | ............... | H02K 13/006 |
| | | | | 310/71 |
| 2018/0123413 A1* | 5/2018 | Akahori | ............... | H02K 15/03 |
| 2019/0305653 A1* | 10/2019 | Fujimoto | ............... | H02K 5/04 |

FOREIGN PATENT DOCUMENTS

| | | |
|---|---|---|
| JP | 2001-103686 A | 4/2001 |
| JP | 2007-124792 A | 5/2007 |
| JP | 2007-194545 A | 8/2007 |
| JP | 2019-058017 A | 4/2019 |

* cited by examiner

ROTARY ELECTRICAL MACHINE

This application is based on and claims the benefit of priority from Japanese Patent Application No. 2018-062659, filed on 28 Mar. 2018, the content of which is incorporated herein by reference.

BACKGROUND OF THE INVENTION

Field of the Invention

The present invention relates to a rotary electrical machine, such as a motor.

Related Art

Some motors include a rotor support member for supporting a rotor and a stator support member for supporting a stator. In configurations disclosed in patent documents 1 and 2, the rotor support member is arranged inside, the stator support member is arranged outside, and the stator support member covers the rotor support member. In such configurations, if the external surface of the stator support member is painted, paint of the external surface of the rotor support member is not always required.

By contrast, if the motor is configured in such a manner that both the rotor support member and the stator support member appear on the appearance of the motor, a manufacturer is to paint both the surface of the rotor support member and the surface of the stator support member. In this case, the manufacturer machines the painted end surface of the rotor support member and the painted end surface of the stator support member and establishes contact between the end surfaces, thereby forming the appearance of the motor.

If the manufacturer is to paint the surfaces of the support members after machining the end surfaces of these support members, the manufacturer is required to mask the machined end surfaces. This requires a part for the masking, thereby increasing takt time and manufacturing cost. By contrast, if the manufacturer is to machine the end surfaces of the support members after painting the surfaces of these support members, masking the machined end surfaces becomes unnecessary, thereby reducing takt time and manufacturing cost.

Patent Document 1: Japanese Unexamined Patent Application, Publication No. H10-112953

Patent Document 2: Japanese Unexamined Patent Application, Publication No. 2001-103686

SUMMARY OF THE INVENTION

However, machining the end surfaces of such parts after painting the surfaces of these parts may cause paint peeling at a boundary part of the paint surface with the machining surface. This requires repair from the paint peeling and requires repair time and a part for the repair, thereby increasing manufacturing cost.

It is therefore an object of the present invention to provide a rotary electrical machine capable of reducing burden of repair from paint peeling that might occur at a boundary part of a paint surface with a machining surface.

(1) The present invention relates to a rotary electrical machine (motor 10 described later, for example) comprising a housing (housing 50 described later, for example) including: a first member (rear-side support collar 43 described later, for example) with a paint surface with paint (paint surface 43a described later, for example) and a machining surface (machining surface 43c described later, for example) adjoining the paint surface after being subjected to machining, the paint surface including a boundary area (boundary area 43b described later, for example) formed at a boundary part with the machining surface; and a second member (second housing body 42 described later, for example) covering the boundary area.

(2) In the rotary electrical machine described in (1), the second member may include a recess (recess $42x$ described later, for example), and the recess may include a first facing surface (first facing surface $42x1$ described later, for example) facing the boundary area, and a second facing surface (second facing surface $42x2$ described later, for example) facing the machining surface.

(3) In the rotary electrical machine described in (1) or (2), the second member may be a member having a painted surface to become an external surface when the housing is in a finished state.

(4) In the rotary electrical machine described in (2), a gap (gap 51 described later, for example) may be formed between the boundary area and the first facing surface, and the machining surface and the second facing surface may contact each other.

(5) In the rotary electrical machine described in (4), the second facing surface may have smaller surface roughness than the first facing surface.

(6) The rotary electrical machine described in any one of (1) to (5) may further comprise: a rotary shaft (rotary shaft 13 described later, for example); a bearing (second bearing 12 described later, for example) that supports the rotary shaft rotatably; a rotor (rotor 20 described later, for example) fixed to the rotary axis; and a stator (stator 30 described later, for example) surrounding the rotor. The first member may be a member that holds the bearing, and the second member may be a member fixed to the stator.

According to the present invention, even if paint peeling occurs at a boundary part of a paint surface with a machining surface, a rotary electrical machine capable of reducing burden of repair from the paint peeling can be provided.

DETAILED DESCRIPTION OF THE INVENTION

Figure 1:
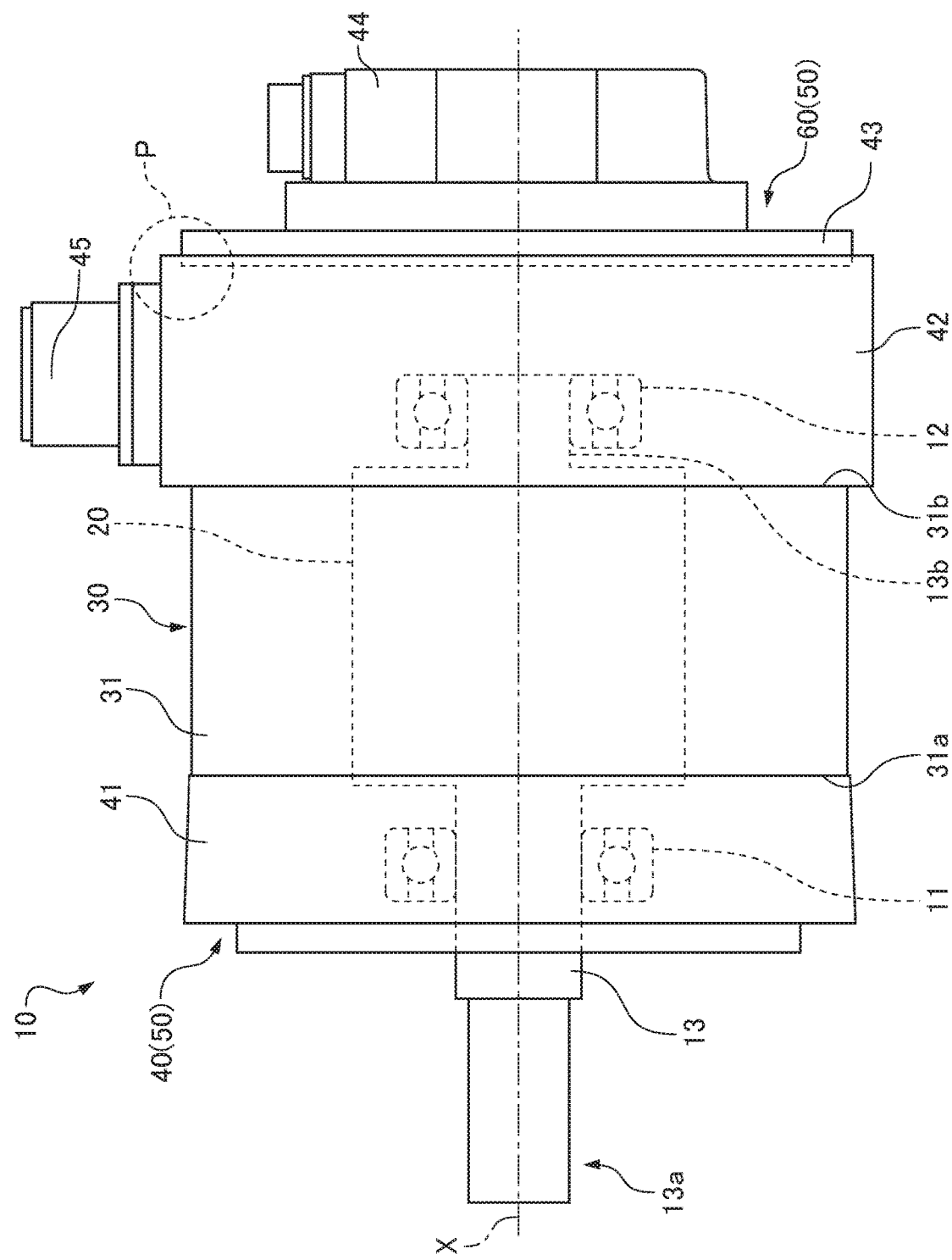
FIG. 1 is a vertical sectional view schematically showing a motor according to an embodiment of the present invention.

A motor as an embodiment of a rotary electrical machine of the present invention will be described below by referring to the drawings. FIG. 1 is a vertical sectional view schematically showing the motor according to the embodiment of the present invention.

Overall Configuration of Motor

A motor 10 of the embodiment includes a rotor 20, a stator 30, a housing 50, a first bearing 11, a second bearing 12, and a rotary shaft 13 as main components.

Rotor

The rotor 20 is fixed to the rotary shaft 13 and rotates integrally with the rotary shaft 13. Both end sections of the rotary shaft 13 are supported by the first bearing 11 and the second bearing 12 so as to be rotatable about a rotary axis line X.

The rotary shaft 13 includes a front section 13a and a rear section 13b. The front section 13a is located at an end section viewed in a direction toward the first bearing 11 (hereinafter also called a "front side"). The rear section 13b is located at an end section viewed in a direction toward the second bearing 12 (hereinafter also called a "rear side").

First Bearing

The first bearing 11 is arranged near the front section 13a of the rotary shaft 13. The first bearing 11 supports the front section 13a of the rotary shaft 13 rotatably. Lubrication oil having high viscosity is retained inside the first bearing 11.

Second Bearing

The second bearing 12 is arranged near the rear section 13b of the rotary shaft 13. The second bearing 12 supports the rear section 13b of the rotary shaft 13 rotatably. Lubrication oil having high viscosity is retained inside the second bearing 12.

Stator

The stator 30 surrounds the rotor 20 and is arranged between a first housing body 41 (described later) and a second housing body 42 (described later) along the rotary axis line X. The stator 30 is a substantially cylindrical member extending along the rotary axis line X. The stator 30 includes a stator core 31 made of a large number of stacked magnetic steel sheets and a winding (not shown) wound around a protrusion (not shown) formed on the inner circumferential surface of the stator core 31.

The stator core 31 includes a front end surface 31a located at an end section toward to the first bearing 11 and a rear end surface 31b located at an end section toward to the second bearing 12.

The winding is fixed to the stator core 31 with resin, for example. The winding protrudes from both of the ends of the stator core 31 into the rotary axis line X and extends along the rotary axis line X. A lead wire (not shown) extended from a connector 45 is connected to the winding. The winding is used for generating a rotating magnetic field using a current supplied through the lead wire. The rotor 20 is configured to rotate integrally with the rotary shaft 13 in response to the rotating magnetic field generated by the stator 30.

Housing

The housing 50 includes a first housing 40 and a second housing 60.

First Housing

The first housing 40 includes the first housing body 41. The first housing body 41 has a front-side section functioning as a front-side support collar that supports the first bearing 11. The first housing body 41 has a rear-side section that forms the external surface of the first housing body 41 in a radial direction. The rear-side section of the first housing body 41 is fastened with a screw to the front end surface 31a of the stator core 31. The first housing body 41 extends from the front end surface 31a of the stator core 31 toward the front section 13a of the rotary shaft 13 and covers the rotary shaft 13 partially, the first bearing 11, and the winding protruding from the stator core 31.

The front section 13a of the rotary shaft 13 protrudes from the first housing body 41. The front section 13a of the rotary shaft 13 functions as an output shaft to be coupled directly or indirectly to the spindle of a machine tool, for example.

Second Housing

The second housing 60 forming a part of the housing 50 includes a rear-side support collar 43 as a first member, a second housing body 42 as a second member, and an encoder 44.

The second housing body 42 forms the external surface of the second housing 60 in the radial direction. The rear-side support collar 43 is a member that holds the second bearing 12. The rear-side support collar 43 is coupled to the rear of the second housing body 42 by being fastened with a screw. The encoder 44 is attached to the rear-side support collar 43 and detects the rotation position, rotation speed, etc. of the rotary shaft 13.

Details of Second Housing 60

Figure 2:
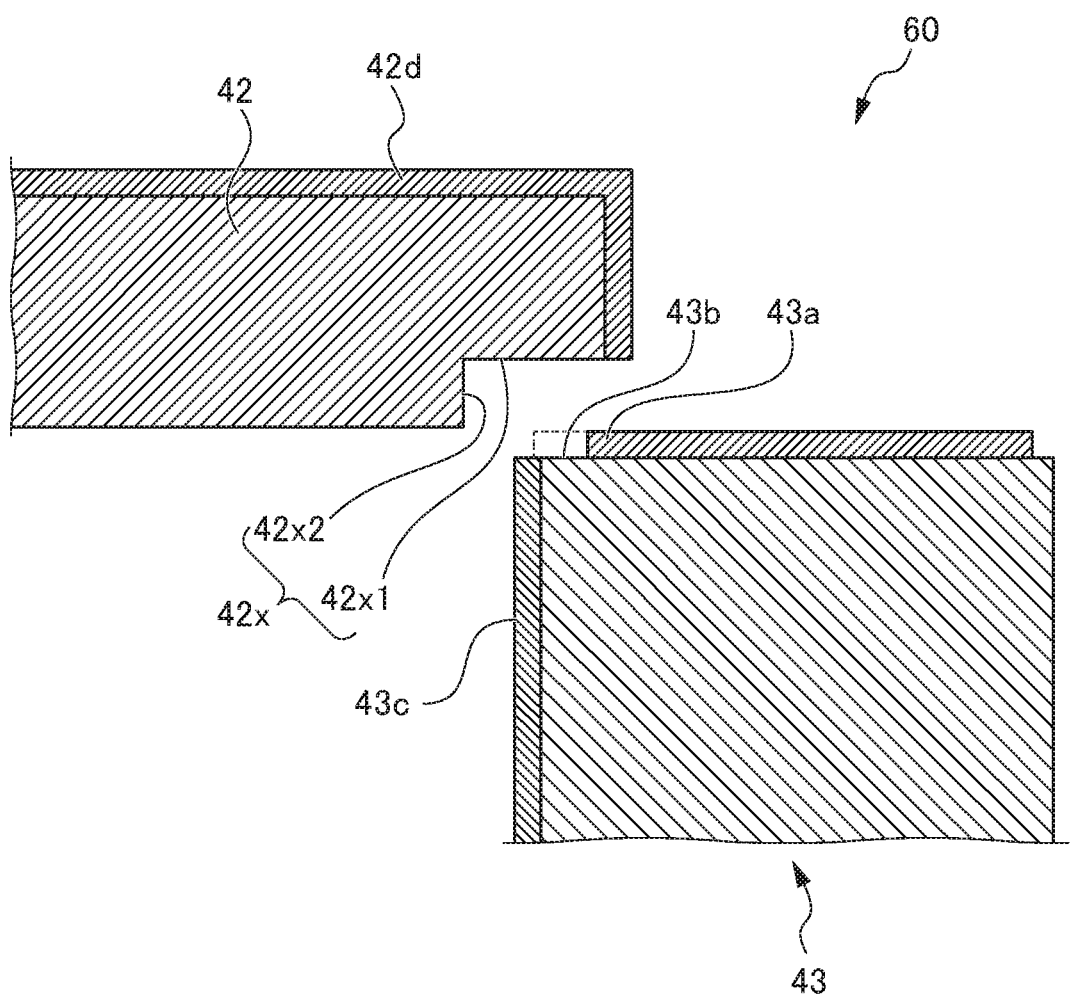
FIG. 2 is an exploded sectional view showing a section P of a second housing 60 in an enlarged manner surrounded by a dashed line in FIG. 1.
Figure 3:
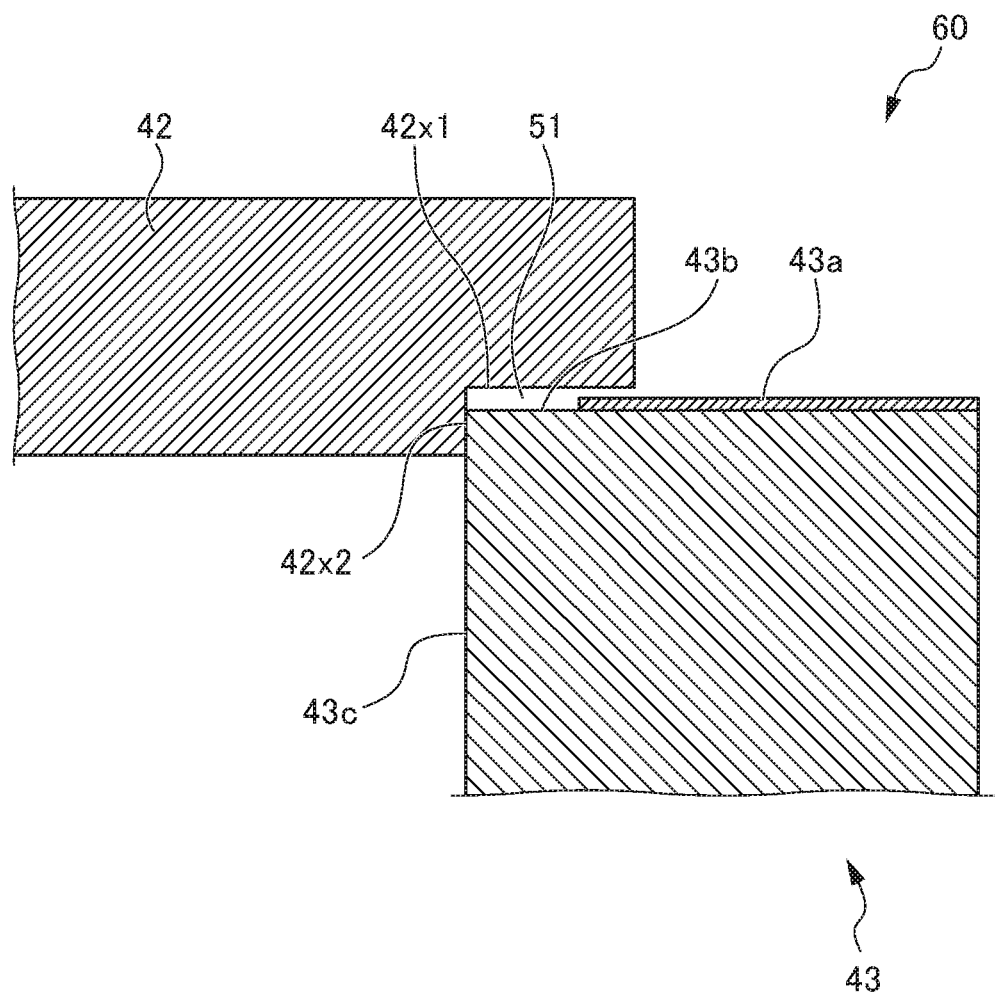
FIG. 3 is a sectional view showing the section P of the second housing 60 in an enlarged manner surrounded by the dashed line in FIG. 1.

The second housing 60 will be described in more detail. FIG. 2 is an exploded sectional view showing a section P of the second housing 60 in an enlarged manner surrounded by a dashed line in FIG. 1. FIG. 3 is a sectional view showing the section P of the second housing 60 in an enlarged manner surrounded by the dashed line in FIG. 1. As shown in FIGS. 2 and 3, the rear-side support collar 43 as the first member includes a paint surface 43a and a machining surface 43c.

The paint surface 43a is a surface with paint. The paint surface 43a is on the lateral surface (external surface in the radial direction) of the rear-side support collar 43. The paint surface 43a partially appears on the appearance of the motor 10 at an external position in the radial direction.

A boundary area 43b is a surface belonging to the paint surface 43a and adjoining the machining surface 43c. In other words, the paint surface 43a includes the boundary area 43b formed at a boundary part with the machining surface 43c. The boundary area 43b is a surface on the lateral surface (external surface in the radial direction) of the rear-side support collar 43 and is not to appear on the appearance of the motor 10 after assembly. The boundary area 43b adjoins the machining surface 43c and is thus exposed to the risk of paint peeling. In the boundary area 43b, paint generally does not peel off entirely and peels off only partially.

The machining surface 43c is a surface adjoining the boundary area 43b of the paint surface 43a and is a surface after being subjected to machining. The machining surface 43c is a surface on the front side of the rear-side support collar 43, a surface perpendicular to the boundary area 43b (paint surface 43a), and is an unpainted surface.

The second housing body 42 as the second member is fixed to the rear end surface 31b of the stator core 31 of the stator 30 by being fastened with a screw. The second housing body 42 is a member having a painted surface to become an external surface when the housing 50 is in a finished state. The second housing body 42 extends along the rotary axis line X from the rear end surface 31b of the stator core 31 toward the rear section 13b of the rotary shaft 13 and covers the rotary shaft 13 partially and the second bearing 12.

The second housing body 42 includes a recess 42x. The recess 42x includes a first facing surface 42x1 and a second facing surface 42x2.

The first facing surface 42x1 is arranged external to the boundary area 43b of the rear-side support collar 43 in the radial direction. The first facing surface 42x1 faces the boundary area 43b entirely and the paint surface 43a partially while pointing inward in the radial direction, and covers the boundary area 43b. The second facing surface 42x2 faces the machining surface 43c of the rear-side support collar 43 while pointing rearward. The second facing surface 42x2 has smaller surface roughness (smoother surface) than the first facing surface 42x1.

The second housing body 42 has an external surface provided with a second paint surface 42d. The second paint surface 42d is not provided at the recess 42x.

Arrangement of the rear-side support collar 43 as the first member and that of the second housing body 42 as the second member relative to each other are designed as follows. As shown in FIG. 3, a gap 51 is provided between a part of the paint surface 43a and the first facing surface 42x1. The machining surface 43c and the second facing surface 42x2 contact each other.

Manufacturing Step

The second housing 60 in the foregoing motor 10 is manufactured by the following steps. Regarding the rear-side support collar 43, paint is applied to the paint surface 43a (including the boundary area 43b). Then, the machining surface 43c is subjected to machining. This machining makes the paint on the paint surface 43a peel off partially. This may result in the occurrence of paint peeling in the boundary area 43b. The second housing body 42 is arranged so as to make the second facing surface 42x2 of the recess 42x of the second housing body 42 contact the machining surface 43c, and to make the first facing surface 42x1 face the paint surface 43a while the gap 51 is left between the first facing surface 42x1 and the paint surface 43a. While these relative arrangements are maintained, the rear-side support collar 43 and the second housing body 42 are fixed (coupled) to each other. More specifically, a bolt (not shown) is passed through a through hole provided at the rear-side support collar 43, and the bolt is threadedly engaged with a female screw provided at the second housing body 42.

Effect of Embodiment

The motor 10 of the embodiment achieves the following effect, for example. The motor 10 of the embodiment includes the housing 50 including: the rear-side support collar 43 as the first member with the paint surface 43a with paint and the machining surface 43c adjoining the paint surface 43a after being subjected to machining, the paint surface 43a including the boundary area 43b formed at a boundary part with the machining surface 43c; and the second housing body 42 as the second member covering the boundary area 43b.

Thus, even if paint peeling occurs at the boundary area 43b of the paint surface 43a, the second housing body 42 covers the boundary area 43b. This makes it possible to reduce burden of repair from the paint peeling.

In the embodiment, the second housing body 42 includes the recess 42x. The recess 42x includes the first facing surface 42x1 facing the boundary area 43b, and the second facing surface 42x2 facing the machining surface 43c. Thus, the first facing surface 42x1 of the recess 42x covers the boundary area 43b to make it unlikely that the boundary area 43b will appear on the appearance.

In the embodiment, the second housing body 42 is a member having a painted surface to become an external surface when the housing 50 is in a finished state. Thus, while the boundary area 43b is present at the rear-side support collar 43, a part from which the paint has peeled off does not appear between the second housing body 42 and the paint surface 43a.

In the embodiment, the gap 51 is formed between the boundary area 43b and the first facing surface 42x1. Further, the machining surface 43c and the second facing surface 42x2 contact each other. By the presence of the gap 51 between the paint surface 43a and the first facing surface 42x1, the first facing surface 42x1 is arranged so as not to contact the paint surface 43a. This reduces the likelihood of peeling of the paint on the paint surface 43a with the first facing surface 42x1. The machining surface 43c and the second facing surface 42x2 contact each other. This enhances waterproof performance between the machining surface 43c and the second facing surface 42x2.

In the embodiment, the second facing surface 42x2 has smaller surface roughness than the first facing surface 42x1. This enhances waterproof performance between the machining surface 43c and the second facing surface 42x2.

Modification

The embodiment of the invention has been described above. In the embodiment, the first facing surface 42x1 is configured to face the boundary area 43b entirely. However, this is not the only configuration. The first facing surface 42x1 may be configured to face the boundary area 43b at least partially. In the embodiment, a motor is described as an example of the rotary electrical machine of the present invention. However, this is not the only example. The rotary electrical machine may be a generator. The first member and the second member are not limited to the rear-side support collar 43 and the second housing body 42 in the foregoing embodiment and may be components of a different member (first housing 40, for example).

EXPLANATION OF REFERENCE NUMERALS

10 Motor (rotary electrical machine)
11 First bearing
12 Second bearing (bearing)
13 Rotary axis
20 Rotor
30 Stator
41 First housing body
42 Second housing body (second member)
42x Recess
42x1 First facing surface
42x2 Second facing surface
43 Rear-side support collar (first member)
43a Paint surface
43b Boundary area
43c Machining surface
50 Housing
51 Gap

What is claimed is:

1. A rotary electrical machine comprising a housing including: a first member with a paint surface with paint and a machining surface adjoining the paint surface after being subjected to machining, the paint surface including a boundary area formed at a boundary part with the machining surface; and a second member covering the boundary area,
wherein the second member includes a recess, and the recess includes a first facing surface facing the boundary area, and a second facing surface facing the machining surface, and
wherein a gap is formed between the boundary area and the first facing surface, and the machining surface and the second facing surface contact each other.

2. The rotary electrical machine according to claim 1, wherein the second member is a member having a painted surface to become an external surface when the housing is in a finished state.

3. The rotary electrical machine according to claim 1, wherein the second facing surface has smaller surface roughness than the first facing surface.

4. The rotary electrical machine according to claim 1, further comprising: a rotary shaft;
a bearing that supports the rotary shaft rotatably;
a rotor fixed to the rotary shaft; and
a stator surrounding the rotor, wherein
the first member is a member that holds the bearing, and
the second member is a member fixed to the stator.

* * * * *